US012584482B1

(12) United States Patent
Pellerin

(10) Patent No.: US 12,584,482 B1
(45) Date of Patent: Mar. 24, 2026

(54) GEAR PUMP PARALLEL LOAD PATH

(71) Applicant: Pratt & Whitney Canada Corp.,
Longueuil (CA)

(72) Inventor: Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/987,550

(22) Filed: Dec. 19, 2024

(51) Int. Cl.
| | |
|---|---|
| *F04C 2/08* | (2006.01) |
| *B64D 27/10* | (2006.01) |
| *F04C 2/14* | (2006.01) |
| *F04C 11/00* | (2006.01) |
| *F04C 15/00* | (2006.01) |

(52) U.S. Cl.
CPC ................ *F04C 2/084* (2013.01); *F04C 2/14* (2013.01); *F04C 11/001* (2013.01); *F04C 15/0061* (2013.01); *F04C 15/0073* (2013.01); *B64D 27/10* (2013.01); *F04C 2240/60* (2013.01)

(58) Field of Classification Search
CPC .......... F04C 2/08–088; F04C 2/10–102; F04C 2/12–14; F04C 18/08–088; F04C 18/10–103; F04C 18/12–14; F04C 11/001–006; F04C 23/001–006
See application file for complete search history.

(56) References Cited

U.S. PATENT DOCUMENTS

| | | | |
|---|---|---|---|
| 2,665,637 A | 1/1954 | Lauck | |
| 2,665,638 A | 1/1954 | Lauck | |

| | | | | |
|---|---|---|---|---|
| 2,767,658 A | | 10/1956 | Murray | |
| 2,865,302 A | * | 12/1958 | Murray | F04C 2/086 418/102 |
| 2,887,058 A | * | 5/1959 | Aspelin | F04C 15/0088 417/310 |
| 2,955,536 A | * | 10/1960 | Gaubatz | F04C 15/0088 417/248 |
| 2,957,418 A | * | 10/1960 | Edwards | F04B 23/12 417/203 |
| 2,961,970 A | * | 11/1960 | Murray | B64D 37/16 418/91 |
| 2,972,959 A | * | 2/1961 | Wilson | F04C 15/0026 418/79 |
| 2,980,028 A | * | 4/1961 | Edwards | F04C 15/0088 418/79 |
| 3,008,426 A | * | 11/1961 | Edwards | F02M 41/08 418/69 |
| 3,026,810 A | * | 3/1962 | Kubiak | F04C 14/26 418/200 |

(Continued)

FOREIGN PATENT DOCUMENTS

| | | | | |
|---|---|---|---|---|
| CN | 107013454 A | * | 8/2017 | ............ F04C 11/001 |
| DE | 19615725 A1 | * | 10/1997 | ............ F04C 11/001 |

*Primary Examiner* — Laert Dounis
(74) *Attorney, Agent, or Firm* — CANTOR COLBURN LLP

(57) ABSTRACT

A gear pump arrangement of an aircraft gas turbine engine is provided. The gear pump arrangement includes an accessory, a quill shaft, two gear pumps in series, axial retention members at the accessory and one of the two gear pumps to axially retain the quill shaft and torque transmitting members (TTMs). The TTMs include a first TTM between the one of the two gear pumps and the quill shaft and a second TTM between the quill shaft and the accessory whereby the quill shaft directly links the one of the two gear pumps to the accessory.

20 Claims, 8 Drawing Sheets

(56) References Cited

U.S. PATENT DOCUMENTS

| 4,754,659 | A | 7/1988 | Rietsch | |
| 10,745,117 | B2 | 8/2020 | Garcia et al. | |
| 11,326,523 | B2 | 5/2022 | Desjardins | |
| 11,905,888 | B2 | 2/2024 | Coutu | |
| 2012/0263614 | A1* | 10/2012 | Reighard | F01C 21/10 |
| | | | | 418/13 |
| 2020/0232388 | A1* | 7/2020 | Alecu | F04C 2/14 |

* cited by examiner

GEAR PUMP PARALLEL LOAD PATH

BACKGROUND

The present disclosure relates to gas turbine engines and, in particular, to a gear pump parallel load path of a gas turbine engine of an aircraft.

In a gas turbine engine, fuel and compressed air are combusted in a combustor to produce a high-temperature and high-pressure fluid. This fluid enters a turbine and interacts with rows or stages of turbine blades and vanes. The interaction between the high-temperature and high-pressure fluid with the turbine blades and vanes causes the stages of turbine blades to rotate a shaft. The shaft rotation drives a compressor to compress the air for the combustor and, as noted above, can be used to drive operations of a generator to produce electricity and/or for propulsion. Besides gas turbine engines, other types of engines of aircraft propulsion systems are available. These include, but are not limited to, electrical engines and hybrid engines. In any case, a gearbox is typically interposed between the engine or power source and a component to be powered, such as a propeller. The gearbox drives the components at a required speed and carries resulting torque and loads.

SUMMARY

A gear pump arrangement of an aircraft gas turbine engine is provided. The gear pump arrangement includes an accessory, a quill shaft, two gear pumps in series, axial retention members at the accessory and one of the two gear pumps to axially retain the quill shaft and torque transmitting members (TTMs). The TTMs include a first TTM between the one of the two gear pumps and the quill shaft and a second TTM between the quill shaft and the accessory whereby the quill shaft directly links the one of the two gear pumps to the accessory.

In accordance with one or more additional and/or alternative embodiments, torque transferred to the accessory is transferred solely by the one of the two gear pumps via the quill shaft.

In accordance with one or more additional and/or alternative embodiments, a greater percentage of input torque is consumed by the one of the two gear pumps than by the other of the two gear pumps.

In accordance with one or more additional and/or alternative embodiments, each of the two gear pumps includes a driving gear and a driven gear and the gear pump arrangement further includes bearings to support the driving gear and the driven gear of each of the two gear pumps and a sliding fit between the driven gear of the other of the two gear pumps and the quill shaft.

In accordance with one or more additional and/or alternative embodiments, an additional gear pump is in series with the two gear pumps and additional TTMs are at the additional gear pump and the one of the two gear pumps, respectively.

In accordance with one or more additional and/or alternative embodiments, each of the TTMs and the additional TTMs includes one of a spline and a woodruff key.

In accordance with one or more additional and/or alternative embodiments, at least one of the axial retention members includes a protrusion extending from the quill shaft and at least one of a nut and a retaining ring fit onto the protrusion.

According to an aspect of the disclosure, a gear pump arrangement of an aircraft gas turbine engine is provided.

The gear pump arrangement includes an accessory, a quill shaft, at least first, second and third gear pumps in series, axial retention members at the accessory and the third gear pump to axially retain the quill shaft, a first torque transmitting member (TTM) between the third gear pump and the quill shaft and a second TTM between the quill shaft and the accessory whereby the quill shaft directly links the third gear pump to the accessory and third and fourth TTMs at the second gear pump whereby the second gear pump directly links to the first and third gear pumps.

In accordance with one or more additional and/or alternative embodiments, torque transferred to the accessory is transferred solely by the third gear pump via the quill shaft.

In accordance with one or more additional and/or alternative embodiments, a greater percentage of input torque is consumed by the third gear pump than by either of the first and second gear pumps.

In accordance with one or more additional and/or alternative embodiments, each of the first, second and third gear pumps includes a driving gear and a driven gear and the gear pump arrangement further includes bearings to support the driving gear and the driven gear of each of the first, second and third gear pumps and a sliding fit between the driven gear of at least the first gear pump and the quill shaft.

In accordance with one or more additional and/or alternative embodiments, the gear pump arrangement further includes a fourth gear pump in series with the third gear pump and fifth and sixth TTMs at the fourth and third gear pumps, respectively.

In accordance with one or more additional and/or alternative embodiments, each of the first-sixth TTMs includes one of a spline and a woodruff key.

In accordance with one or more additional and/or alternative embodiments, at least one of the axial retention members includes a protrusion extending from the quill shaft and at least one of a nut and a retaining ring fit onto the protrusion.

According to an aspect of the disclosure, a gear pump arrangement is provided and includes a quill shaft, first, second and third gear pumps, axial retention members at the first and third gear pumps to axially retain the quill shaft, a first torque transmitting members (TTM) between the third gear pump and the quill shaft and a second TTM between the quill shaft and the first gear pump whereby the quill shaft directly links the first and third gear pumps and third and fourth TTMs between the third gear pump and the second gear pump whereby the third gear pump directly links to the second gear pump.

In accordance with one or more additional and/or alternative embodiments, the first and second gear pumps are driven in parallel by the third gear pump.

In accordance with one or more additional and/or alternative embodiments, each of the first, second and third gear pumps includes a driving gear and a driven gear and the gear pump arrangement further includes bearings to support the driving gear and the driven gear of each of the first, second and third gear pumps.

In accordance with one or more additional and/or alternative embodiments, the quill shaft extends through the driven gear of the second gear pump.

In accordance with one or more additional and/or alternative embodiments, each of the first-fourth TTMs includes one of a spline and a woodruff key.

In accordance with one or more additional and/or alternative embodiments, at least one of the axial retention members includes a protrusion extending from the quill shaft and at least one of a nut and a retaining ring fit onto the protrusion.

According to an aspect of the disclosure, a gear pump arrangement of an aircraft gas turbine engine is provided. The gear pump arrangement includes an accessory, first and second quill shafts, at least first, second and third gear pumps in series, first axial retention members at the accessory and the third gear pump for first quill shaft axial retention, second axial retention members at the first and third gear pumps for second quill shaft axial retention, first torque transmitting members (TTMs) between the first quill shaft and each of the third gear pump and the accessory whereby the first quill shaft directly links the third gear pump to the accessory, second TTMs between the second quill shaft and each of the first and third gear pumps whereby the second quill shaft directly links the first and third gear pumps and an additional TTM between the first quill shaft and a driving gear of the second gear pump.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following disclosure is applicable to any type of gas turbine engine, including, but not limited to, turbofans, turboshafts, turboprops, turbojets, electrical drives, hybrid drives, etc. The gas turbine engine described below is provided by way of example, and should not be interpreted as limiting the scope of the application or the claims in any way.

Figure 1:
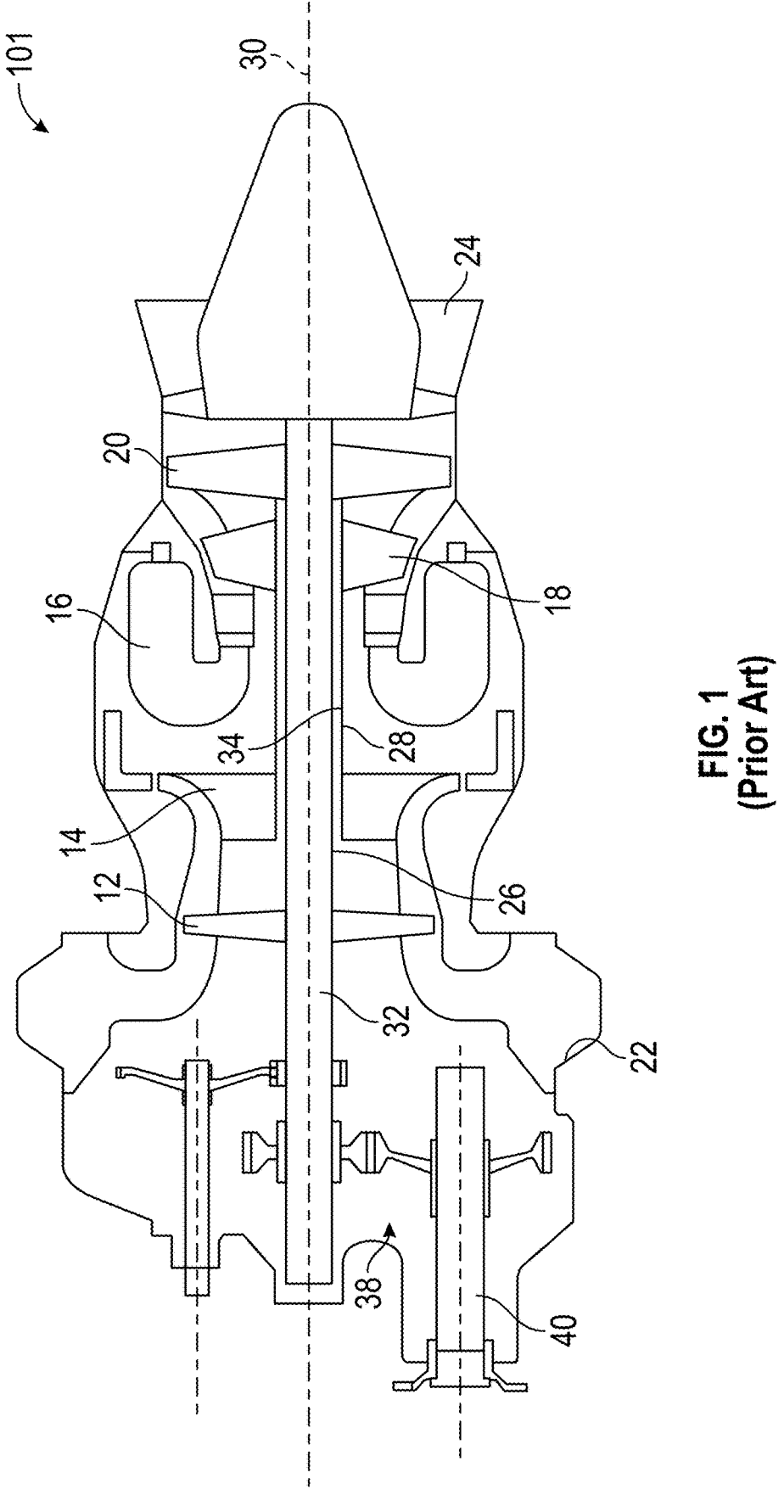
FIG. 1 is a cross-sectional view of a prior art turboshaft engine.

With reference to FIG. 1, a turboshaft engine 101 is provided and configured as a gas turbine engine. In particular, the turboshaft engine 101 is a generally conventional turboshaft engine generally including, in serial flow communication, a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14 and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The turboshaft engine 101 has multiple, i.e. two or more, spools which may perform the compression to pressurize the air received through an air inlet 22, and which extract energy from the combustion gases before they exit via an exhaust outlet 24. For example, the turboshaft engine 101 can include a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The turboshaft engine 101 may further include a transmission 38 driven by the low pressure shaft 32 and driving a rotatable output shaft 40. The transmission 38 may vary a ratio between rotational speeds of the low pressure shaft 32 and the output shaft 40.

In a gearbox of a turboshaft engine, such as the turboshaft engine 101 of FIG. 1, a typical gear pump arrangement includes multiple pumps. Each of the multiple pumps can feature a variety of components, including bearing members that are typically journal bearings (also known as bushings or plain bearings), roller, needle or ball bearings, torque transmitting members (TTMs), such as splines and woodruff keys, and sliding fits that operate similarly to bearings in that they support radial loads while leaving other degrees of freedom free. In gear pumps, loads seen at the bearings and sliding fits can be caused by pump fluidic reactions and gear meshing reactions. For design convenience, a torque consuming accessory or accessories, with any given function, related or not to the pumps, can be added at the end of the pumps. In some cases, in order to minimize pump length, conscribed features can be exploited rather than having all features in series. For instance, a second pump in a gear pump arrangement can support its adjacent pump stages with a sliding fit with corresponding TTMs laying underneath the corresponding gear.

Although gear pump arrangements can be space efficient, they tend to have certain disadvantages. These include limited radial sizes of TTMs nested below gears with corresponding limits to maximum torque transmission capacity.

A need therefore exists for a gear pump arrangement of a gas turbine engine, such as a gas turbine engine of an aircraft, that increases lifespans of nested TTMs with limited radial sizes for a given input torque or that increases torque transmission capability by providing an alternate load path thereby reducing the torque transmitted at each of the TTMs.

Thus, as will be described below, a gear pump arrangement of a gas turbine engine, such as a gas turbine engine of an aircraft, is provided with a series of pumps and a quill shaft concept. The presence of the quill shaft reduces torque transmission through one or more of the pumps (i.e., the second pump) by linking one or more of the pumps (i.e., the third pump) directly to an accessory. As such, the torque transmitted through the second pump to be equal to the torque transmission capability of the first and second pumps. This allows for higher input torque for comparable TTM size.

Figure 2:
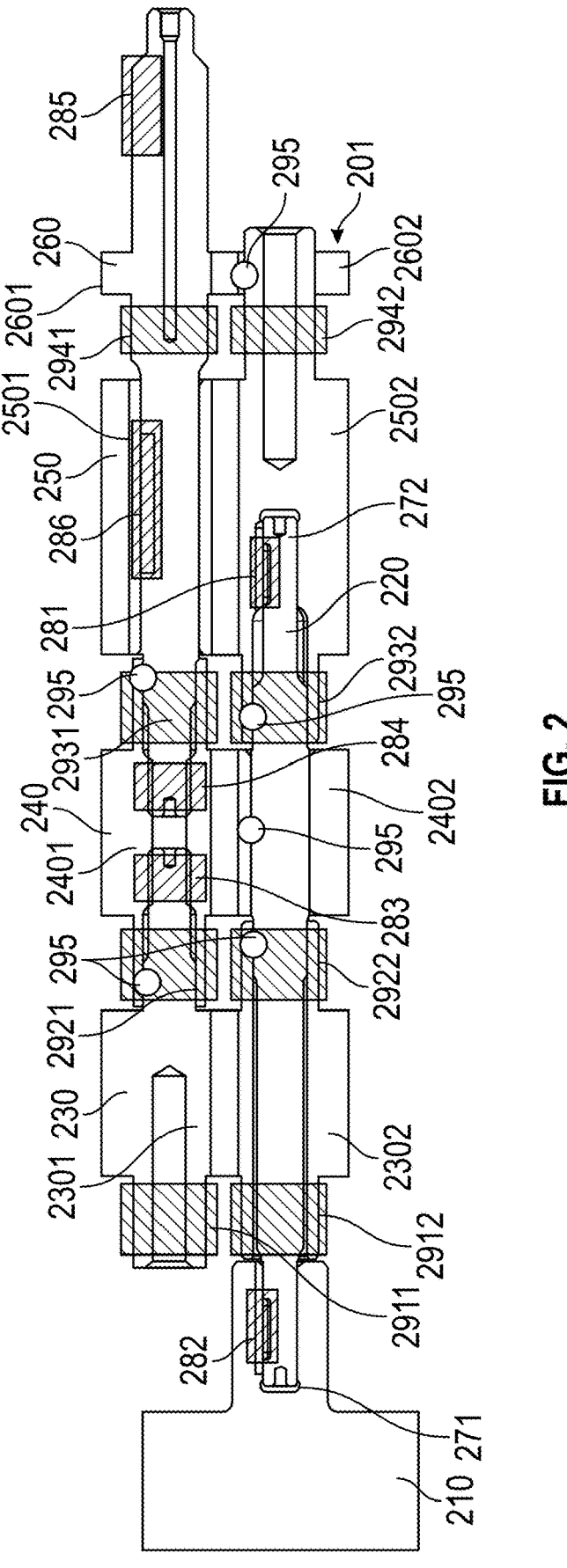
FIG. 2 is a cross-sectional view of a gear pump arrangement in accordance with embodiments.
Figure 3:
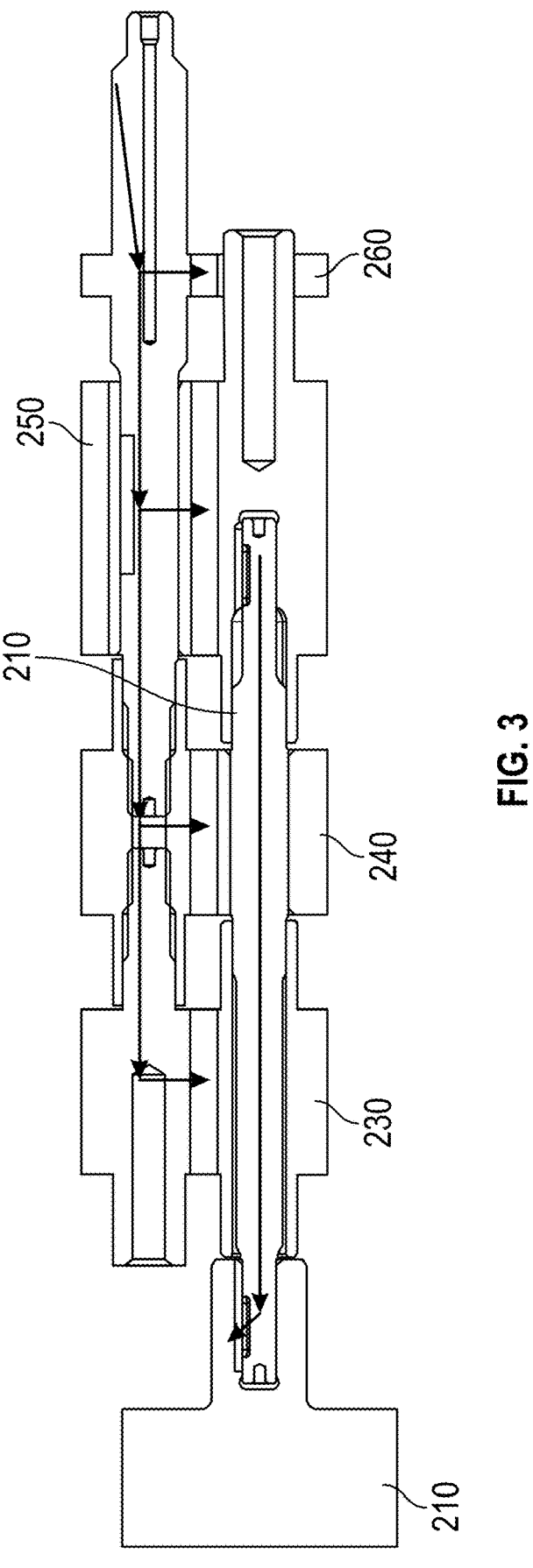
FIG. 3 is a cross-sectional view of the gear pump arrangement of FIG. 2 illustrating a torque path through the gear pump arrangement in accordance with embodiments.

With reference to FIGS. 2 and 3, a gear pump arrangement 201 of an aircraft gas turbine engine is provided. The gear pump arrangement 201 includes an accessory 210, a quill shaft 220 and at least a first gear pump 230, a second gear pump 240 and a third gear pump 250. A fourth gear pump 260 can also be provided and the following description will relate to cases in which the gear pump arrangement 201 includes the fourth gear pump 260. The first gear pump 230, the second gear pump 240, the third gear pump 250 and the fourth gear pump 260 can be disposed in series with one another with the fourth gear pump 260 being receptive of input torque that is to be consumed by the first-fourth gear pumps 230-260 and being receptive of torque transmitted to the accessory 210. The gear pump arrangement 201 further includes a first axial retention member 271 at the accessory 210 and a second axial retention member 272 at the third gear pump 250. The first axial retention member 271 and the second axial retention member 272 are configured to provide for axial retention of the quill shaft 220.

The first gear pump 230 includes a driving gear 2301 and a driven gear 2302, the second gear pump 240 includes a driving gear 2401 and a driven gear 2402, the third gear pump 250 includes a driving gear 2501 and a driven gear 2502 and the fourth gear pump 260 includes a driving gear 2601 and a driven gear 2602.

The gear pump arrangement 201 also includes a first TTM 281, a second TTM 282, a third TTM 283 and a fourth TTM 284. The first TTM 281 is disposed between the driven gear 2502 of the third gear pump 250 and the quill shaft 220 and the second TTM 282 is disposed between the quill shaft 220 and the accessory 210 such that the quill shaft 220 directly links the third gear pump 250 to the accessory 210. The third TTM 283 and the fourth TTM 284 are disposed at the driving gear 2401 of the second gear pump 240 whereby at least the driving gear 2401 of the second gear pump 240 is directly linked to the driving gear 2301 of the first gear pump 230 and to the driving gear 2501 of the third gear pump 250. Where the gear pump arrangement 201 includes the fourth gear pump 260, the gear pump arrangement 201 can also include a fifth TTM 285 at the fourth gear pump 260 and a sixth TTM 286 at the driving gear 2501 of the third gear pump 250 whereby (a driving gear of) the fourth gear pump 260 and the driving gear 2501 of the third gear pump 250 can each be receptive of some amount of input.

In accordance with embodiments, each of the first TTM 281, the second TTM 282, the third TTM 283, the fourth TTM 284, the fifth TTM 285 and the sixth TTM 286 can include one of a spline and a woodruff key.

The gear pump arrangement 201 can also include first bearings 2911 and 2912 to support at least respective sides of the driving gear 2301 and the driven gear 2302 of the first gear pump 230, second bearings 2921 and 2922 to support at least complementary respective sides of the driving gear 2301 and the driven gear 2302 of the first gear pump 230 and the driving gear 2401 and the driven gear 2402 of the second gear pump 240, third bearings 2931 and 2932 to support at least complementary respective sides of the driving gear 2401 and the driven gear 2402 of the second gear pump 240 and the driving gear 2501 and the driven gear 2502 of the third gear pump 250, fourth bearings 2941 and 2942 to support at least complementary respective sides of the driving gear 2501 and the driven gear 2502 of the third gear pump 250 and (the driving gear of) the fourth gear pump 260 and sliding fits 295 that only support radial loads.

Notably, as shown in FIG. 2, the sliding fit 295 can be between the quill shaft 220 and the driven gear 2402 of the second gear pump 240 with additional sliding fits 295 between the driven gears 2302 and 2502 of the first and third gear pumps 230 and 250. These sliding fits 295 alleviate a need for line boring as the sliding fits 295 can accommodate small tilting of the quill shaft 220 and some degree of misalignment between the respective bores of the driven gears 2302, 2402 and 2502 of the first, second and third gear pumps 230, 240 and 250. That is, the quill shaft 220 serves to transmit torque from the third gear pump 250 to the accessory 210 and also provides rotational support to at least the driven gear 2402 of the second gear pump 240 by way of the sliding fit 295. In this way, the presence of the quill shaft 220 allows for reduced torque at the third TTMs 283 and the fourth TTM 284.

With the configuration described above and as shown in FIG. 3, input torque is received at the fourth gear pump 260, transmitted along the serial arrangement of the third gear pump 250, the second gear pump 240 and the first gear pump 230 and transmitted to the quill shaft 220 such that torque that is transmitted to the accessory 210 via the quill shaft 220 is transmitted solely by the third gear pump 250 and such that a greater percentage of the input torque is consumed by the third gear pump 250 than by any other gear pump in the gear pump arrangement 201. In some cases, about 34% of the input torque is transferred to the accessory 210 solely by the third gear pump 240 via the quill shaft 220 with the first gear pump 230 and the second gear pump 240 each requiring and consuming about 15% of the input torque to the accessory 210 via the quill shaft 210. Thus, the third TTM 283 and the fourth TTM 284 could be receptive of 15% and 30% of total input torque and the respective sizes of the third TTM 283 and the fourth TTM 284 can be sufficient given that a size of the second gear pump 240 is limited by a size of a housing surrounding the gear pump arrangement 201.

Figure 4:
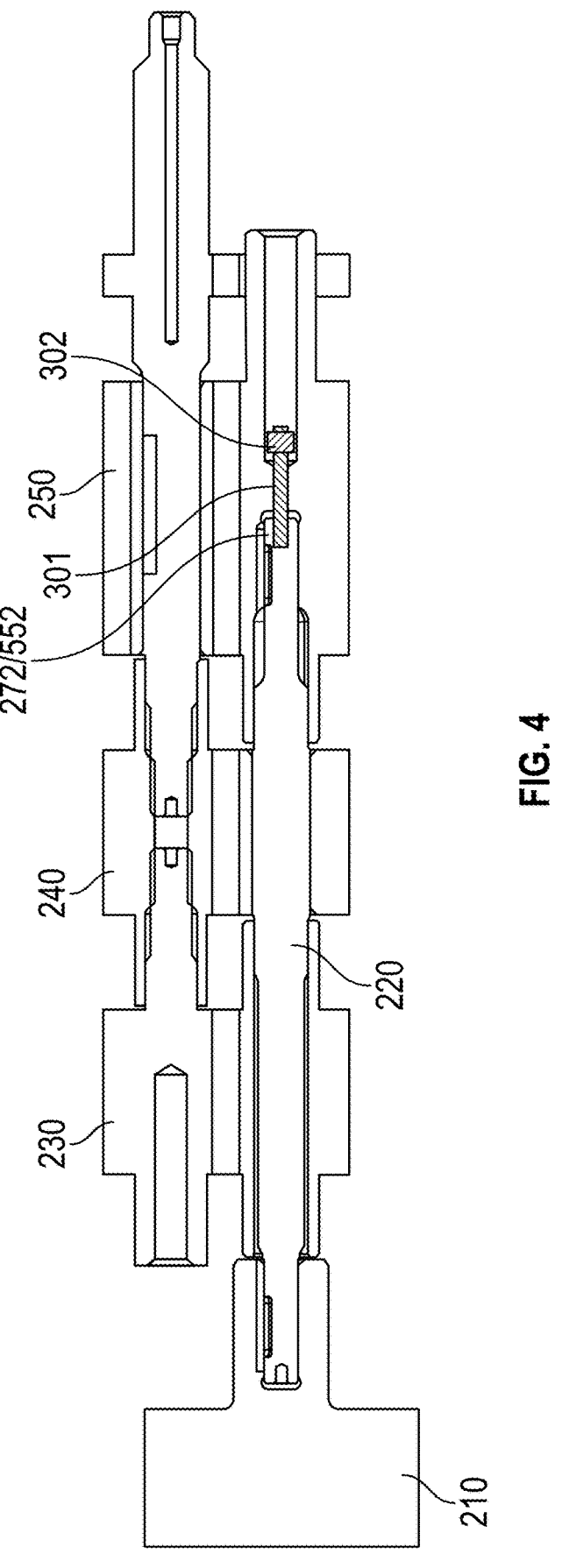
FIG. 4 is a cross-sectional view illustrating axial retention of a quill shaft for a gear pump arrangement in accordance with embodiments.

With continued reference to FIGS. 2 and 3 and with additional reference to FIG. 4, at least one of the first axial retention member 271 and the second axial retention member 272 can include a protrusion 301 extending from the quill shaft 220 and a fittable part 302, such as at least one of a nut and a retaining ring, which can be fit onto the protrusion 301.

Figure 5:
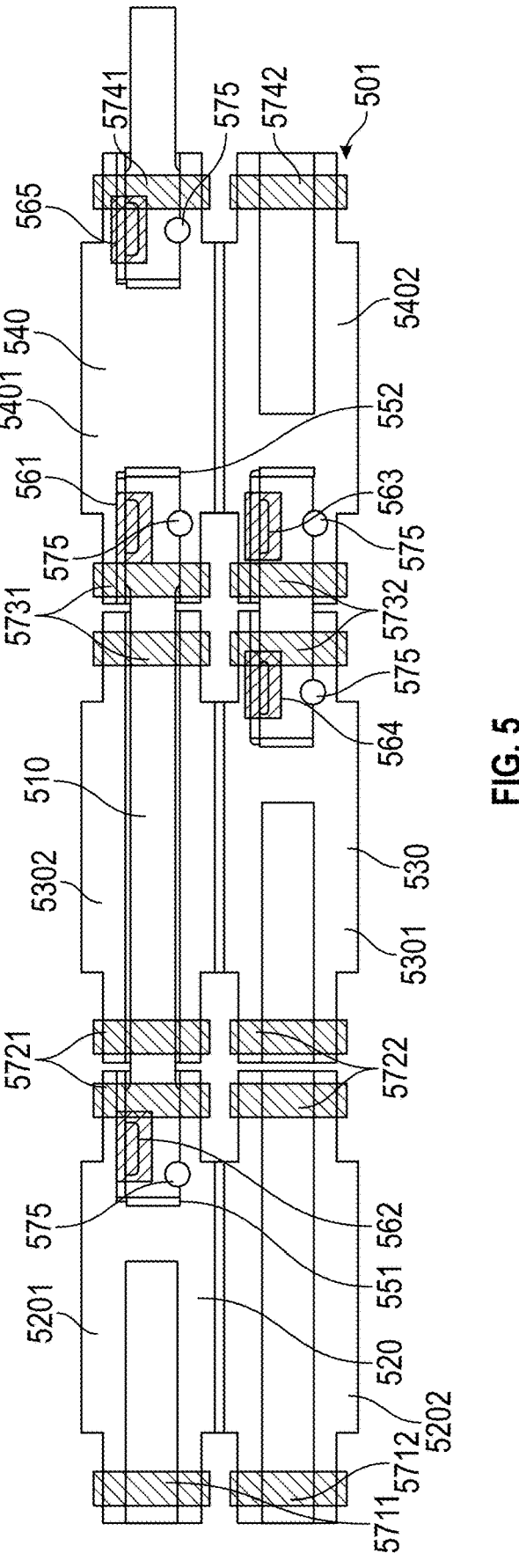
FIG. 5 is a cross-sectional view of a gear pump arrangement with gear pumps being driven in parallel in accordance with embodiments.
Figure 6:
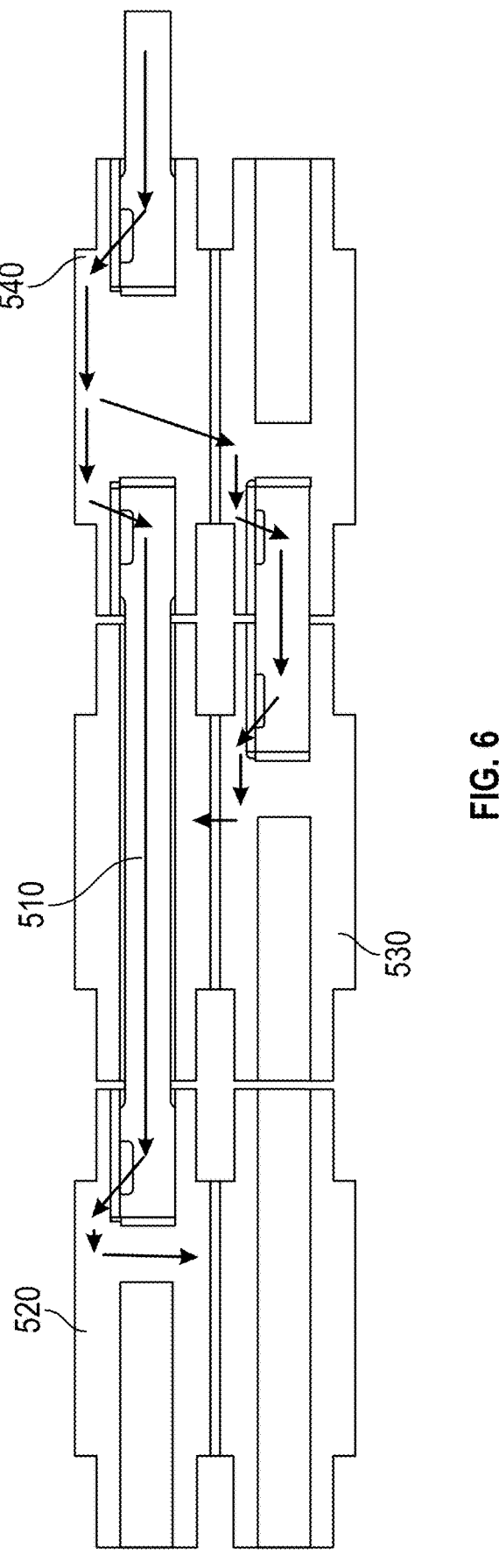
FIG. 6 is a cross-sectional view of the gear pump arrangement of FIG. 5 illustrating a torque path through the gear pump arrangement in accordance with embodiments.

With reference to FIGS. 5 and 6, a gear pump arrangement 501 of an aircraft gas turbine engine is provided. The gear pump arrangement 501 includes a quill shaft 510, a first gear pump 520 with a driving gear 5201 and a driven gear 5202, a second gear pump 530 with a driving gear 5301 and a driven gear 5302 and a third gear pump 540 with a driving gear 5401 and a driven gear 5402. The first gear pump 520 and the second gear pump 530 can be disposed in parallel with one another. The first gear pump 520 and the second gear pump 530 are each disposed in series with the third gear pump 540. That is, the driving gear 5401 of the third gear pump 540 drives the driving gear 5201 of the first gear pump 520 via the quill shaft 510 and the driving gear 5401 of the third gear pump 540 drives the driving gear 5301 of the second gear pump 530 via the driven gear 5402. The driving gear 5301 of the second gear pump 530 drives the driven gear 5302 of the second gear pump 530 and the quill shaft 510 extends through the driven gear 5302 of the second gear pump 530.

As shown in FIG. 6, input torque received by the third gear pump 540 is transmitted to each of the first gear pump 520 and the second gear pump 530 for driving the first gear pump 520 and the second gear pump 530 in parallel. The gear pump arrangement 501 further includes a first axial retention member 551 at the first gear pump 520 and a second axial retention member 552 at the third gear pump 540. The first axial retention member 551 and the second axial retention member 552 are configured to provide for axial retention of the quill shaft 510.

The gear pump arrangement 501 also includes a first TTM 561, a second TTM 562, a third TTM 563 and a fourth TTM 564. The first TTM 561 is disposed between the driving gear 5401 of the third gear pump 540 and the quill shaft 510 and the second TTM 562 is disposed between the quill shaft 510 and the driving gear 5201 of the first gear pump 520 such that the quill shaft 510 directly links the first gear pump 520 and the third gear pump 540. The third TTM 563 and the fourth TTM 564 are disposed between the driven gear 5402 of the third gear pump 540 and the driving gear 5301 of the second gear pump 530 whereby the third gear pump 540 is directly linked to the second gear pump 530. A fifth TTM 565 can be provided at the third gear pump 540 whereby the third gear pump 540 can be receptive of the input torque.

In accordance with embodiments, each of the first TTM 561, the second TTM 562, the third TTM 563, the fourth TTM 564 and the fifth TTM 565 can include one of a spline and a woodruff key.

The gear pump arrangement 501 can also include first bearings 5711 and 5712 to support at least respective sides of the driving gear 5201 and the driven gear 5202 of the first gear pump 520, pairs of second bearings 5721 and 5722 to support at least complementary respective sides of the driving gear 5201 and the driven gear 5202 of the first gear pump 520 and the driven gear 5302 and the driving gear 5301 of the second gear pump 530, pairs of third bearings

5731 and 5732 to support at least complementary respective sides of the driven gear 5302 and the driving gear 5301 of the second gear pump 530 and the driving gear 5401 and the driven gear 5402 of the third gear pump 540, fourth bearings 5741 and 5742 to support at least respective sides of the driving gear 5401 and the driven gear 5402 of the third gear pump 540 and sliding fits 575 that only support radial loads.

With continued reference to FIGS. 5 and 6 and with additional reference back to FIG. 4, at least one of the first axial retention member 551 and the second axial retention member 552 can include the protrusion 301 extending from the quill shaft 220 of FIG. 4 and the fittable part 302, such as at least one of a nut and a retaining ring, which can be fit onto the protrusion 301.

Figure 7:
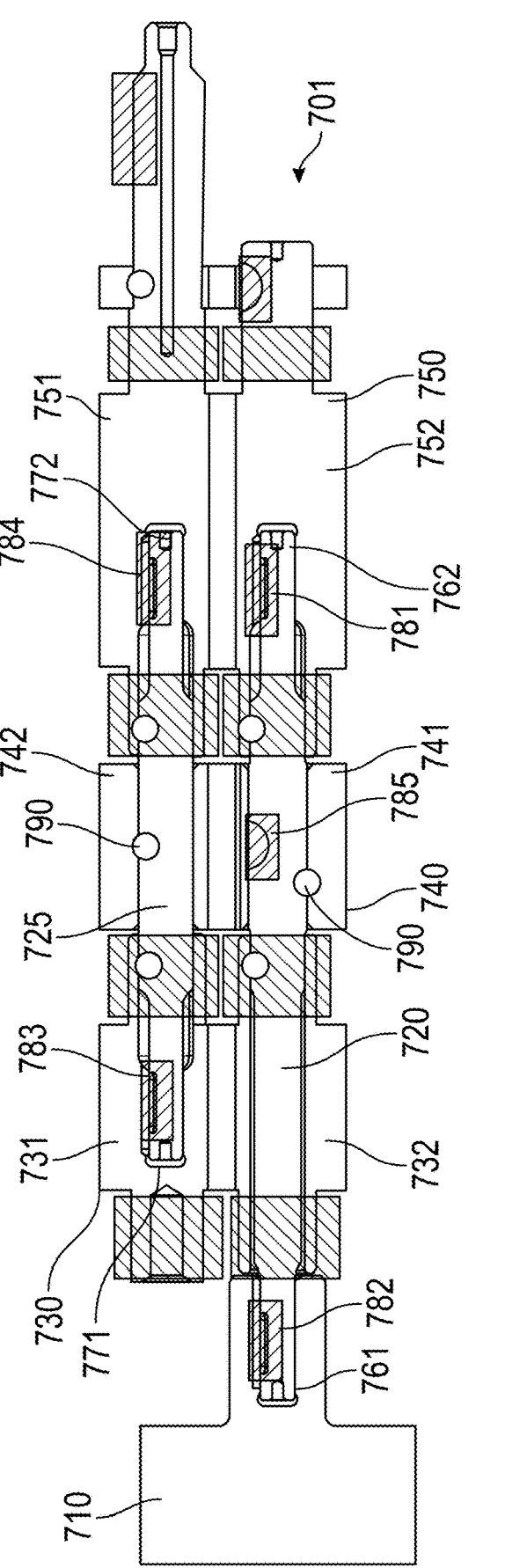
FIG. 7 is a cross-sectional view of a gear pump arrangement in accordance with embodiments.
Figure 8:
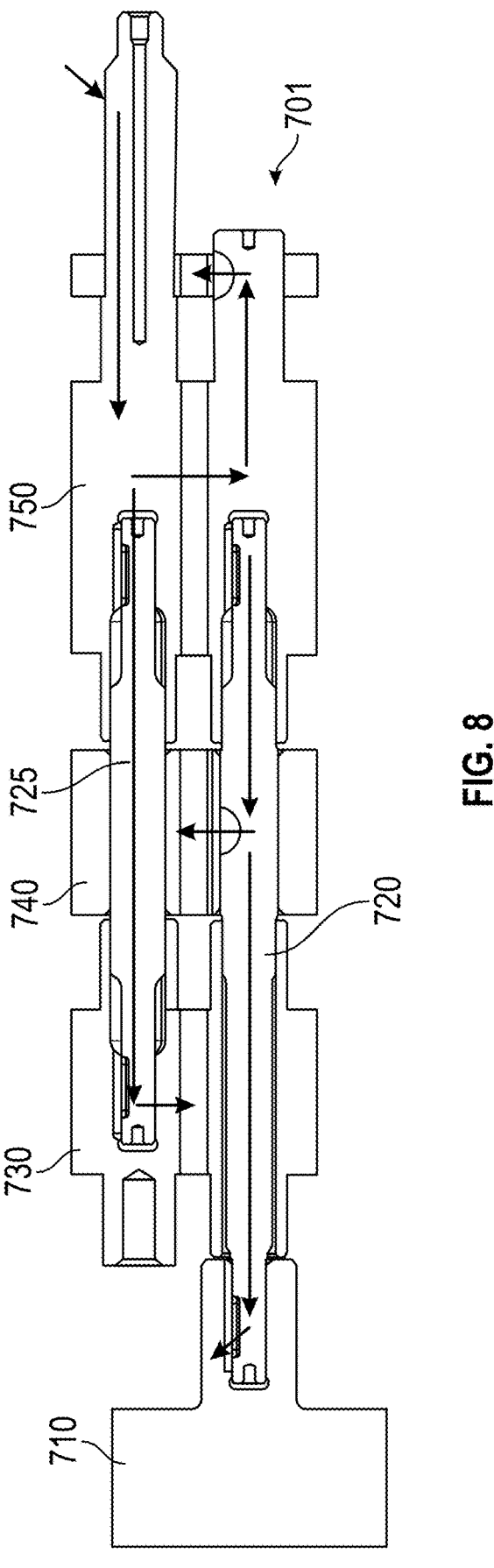
FIG. 8 is a cross-sectional view of the gear pump arrangement of FIG. 7 illustrating a torque path through the gear pump arrangement in accordance with embodiments.

With reference to FIGS. 7 and 8, a gear pump arrangement 701 of an aircraft gas turbine engine is provided. The gear pump arrangement 701 is generally similar to the gear pump arrangements discussed above and only the differences will be discussed below. As shown in FIG. 7, the gear pump arrangement 701 includes an accessory 710, a first quill shaft 720, a second quill shaft 725, at least a first gear pump 730 with a driving gear 731 and a driven gear 732, a second gear pump 740 with a driving gear 741 and a driven gear 742 and a third gear pump 750 with a driving gear 751 and a driven gear 752 in series, first axial retention members 761, 762 at the accessory 710 and the third gear pump 750 for axial retention of the first quill shaft 720, second axial retention members 771, 772 at the first gear pump 730 and the third gear pump 750 for axial retention of the second quill shaft 725, first TTMs 781, 782, second TTMs 783, 784 and an additional TTM 785.

The first quill shaft 720 extends through the driving gear 741 of the second gear pump 740 and the second quill shaft extends through the driven gear 742 of the second gear pump 740. The first TTMs 781, 782 are disposed between the first quill shaft 720 and each of the driven gear 752 of the third gear pump 750 and the accessory 710 whereby the first quill shaft 720 directly links the third gear pump 750 to the accessory 710. The second TTMs 783, 784 are disposed between the second quill shaft 725 and the driving gears 731 and 751 of each of the first gear pump 730 and the third gear pump 750 whereby the second quill shaft 725 directly links the first gear pump 730 and the third gear pump 750. The additional TTM 785 is disposed between the first quill shaft 720 and the driving gear 741 of the second gear pump 740. A sliding fit 790 is provided between the driven gear 742 of the second gear pump 740.

Technical effects and benefits of the present disclosure are the provision of a gear pump arrangement that is characterized as an alternate oil pump architecture with improved load sharing to maintain a compact design that can be fit within existing housing envelopes.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A gear pump arrangement of an aircraft gas turbine engine, the gear pump arrangement comprising:
   an accessory;
   a quill shaft;
   two gear pumps in series;
   axial retention members at the accessory and one of the two gear pumps to axially retain the quill shaft; and
   torque transmitting members (TTMs) comprising a TTM between the one of the two gear pumps and the quill shaft and a TTM between the quill shaft and the accessory whereby the quill shaft directly links the one of the two gear pumps to the accessory.

2. The gear pump arrangement according to claim 1, wherein torque transferred to the accessory is transferred solely by the one of the two gear pumps via the quill shaft.

3. The gear pump arrangement according to claim 1, wherein a greater percentage of input torque is consumed by the one of the two gear pumps than by the other of the two gear pumps.

4. The gear pump arrangement according to claim 1, wherein each of the two gear pumps comprises a driving gear and a driven gear and the gear pump arrangement further comprises:
   bearings to support the driving gear and the driven gear of each of the two gear pumps; and
   a sliding fit between the driven gear of the other of the two gear pumps and the quill shaft.

5. The gear pump arrangement according to claim 1, further comprising:
   an additional gear pump in series with the two gear pumps; and
   additional TTMs at the additional gear pump and the one of the two gear pumps, respectively.

6. The gear pump arrangement according to claim 5, wherein each of the TTMs and the additional TTMs comprises one of a spline and a woodruff key.

7. The gear pump arrangement according to claim 1, wherein at least one of the axial retention members comprises a protrusion extending from the quill shaft and at least one of a nut and a retaining ring fit onto the protrusion.

8. A gear pump arrangement of an aircraft gas turbine engine, the gear pump arrangement comprising:
   an accessory;
   a quill shaft;
   at least first, second and third gear pumps in series;
   axial retention members at the accessory and the third gear pump to axially retain the quill shaft;
   a first torque transmitting member (TTM) between the third gear pump and the quill shaft and a second TTM between the quill shaft and the accessory whereby the quill shaft directly links the third gear pump to the accessory; and third and fourth TTMs at the second gear pump whereby the second gear pump directly links to the first and third gear pumps.

9. The gear pump arrangement according to claim 8, wherein torque transferred to the accessory is transferred solely by the third gear pump via the quill shaft.

10. The gear pump arrangement according to claim 9, wherein a greater percentage of input torque is consumed by the third gear pump than by either of the first and second gear pumps.

11. The gear pump arrangement according to claim 8, wherein each of the first, second and third gear pumps comprises a driving gear and a driven gear and the gear pump arrangement further comprises:
   bearings to support the driving gear and the driven gear of each of the first, second and third gear pumps; and
   a sliding fit between the driven gear of at least the first gear pump and the quill shaft.

12. The gear pump arrangement according to claim 8, further comprising:
   a fourth gear pump in series with the third gear pump; and
   fifth and sixth TTMs at the fourth and third gear pumps, respectively.

13. The gear pump arrangement according to claim 12, wherein each of the first-sixth TTMs comprises one of a spline and a woodruff key.

14. The gear pump arrangement according to claim 8, wherein at least one of the axial retention members comprises a protrusion extending from the quill shaft and at least one of a nut and a retaining ring fit onto the protrusion.

15. A gear pump arrangement, comprising:
   a quill shaft;
   first, second and third gear pumps;
   axial retention members at the first and third gear pumps to axially retain the quill shaft;
   a first torque transmitting member (TTM) between the third gear pump and the quill shaft and a second TTM between the quill shaft and the first gear pump whereby the quill shaft directly links the first and third gear pumps; and
   third and fourth TTMs between the third gear pump and the second gear pump whereby the third gear pump directly links to the second gear pump.

16. The gear pump arrangement according to claim 15, wherein the first and second gear pumps are driven in parallel by the third gear pump.

17. The gear pump arrangement according to claim 16, wherein:
   each of the first, second and third gear pumps comprises a driving gear and a driven gear and the gear pump arrangement further comprises:
   bearings to support the driving gear and the driven gear of each of the first, second and third gear pumps.

18. The gear pump arrangement according to claim 17, wherein the quill shaft extends through the driven gear of the second gear pump.

19. The gear pump arrangement according to claim 16, wherein each of the first-fourth TTMs comprises one of a spline and a woodruff key.

20. The gear pump arrangement according to claim 16, wherein at least one of the axial retention members comprises a protrusion extending from the quill shaft and at least one of a nut and a retaining ring fit onto the protrusion.

* * * * *